Patented Aug. 18, 1931

1,819,457

UNITED STATES PATENT OFFICE

WILLIAM M. DEHN, OF SEATTLE, WASHINGTON

COLLOIDED STARCH EXPLOSIVE AND PROCESS OF MANUFACTURING THE SAME

No Drawing.   Application filed January 10, 1924. Serial No. 685,455.

My invention relates to new and improved explosive compositions, and their process of manufacture, of starch and an oxidant such as, for example, the soluble nitrates, so combined by gelatinizing and coagulating with water and drying their mixtures that the two materials are brought substantially into minutest subdivision, into blended physical contact, and into a state of adhesiveness not obtainable by mere mixing.

The explosive advantages of this novel and intimate contact and blending of the materials, as contrasted with mere mingled mechanical mixtures of the same, are such as adaptability to granulation and moulding, increased explosive power, increased sensitiveness and certainty of detonation, increased density and toughness of grains, decreased hygroscopic capacity, and decreased tendency toward caking by recrystallization of the salts. Explosive advantages of compositions of colloided starch and, for, example, ammonium nitrate, as contrasted with the chemical compound nitrostarch, are such as increased power and stability, decreased cost, and lessened hazard towards combustion.

When exploded the colloided compositions conserve the exothermic energy always lost when starch is converted into nitrostrach. This can be observed in the following chemical equations:

|  | $V_{1000}$ | Per cent starch |
|---|---|---|
| (a) $C_{30}H_{50}O_{25}+12HNO_3=C_{30}H_{38}O_{25}(NO_2)_{12}+12H_2O$ |  | 51.7 |
| (b) $C_{30}H_{38}O_{25}(NO_2)_{12}=30CO+19H_2O+6N_2$ | 81.4 |  |
| (c) $C_{30}H_{50}O_{25}+30NH_4NO_3=30CO+85H_2O+30N_2$ | 90.3 | 25.2 |
| (d) $C_{30}H_{50}O_{25}+60NH_4NO_3=30CO_2+145H_2O+60N_2$ | 83.8 | 14.4 |

The elimination of the twelve molecules of water in the process of nitration of starch, of course, represents a direct thermal loss and also an indirect explosive loss resulting from the decrease of the volume relation ($V_{1000}$) of the explosive gases. The costly process of nitration of starch can, therefore, not only be dispensed with, but a substantial saving of explosive energy can be conserved in the coagulated compositions. The state of minuteness and intimacy of contact of materials obtainable in the latter, on the one hand, approximates that of the nitro group for starch in nitrostarch and, on the other hand, is far greater and more adhesive than can be obtained by mere mixing of starch and ammonium nitrate. The minuteness and adhesiveness in the coagulated compositions, as contrasted with corresponding simple mechanical mixtures, supply the conditions for certainty of explosion of each grain, because, during the time of explosive dispersion, each grain is substantially possessed of both oxidant and combustible.

It is well known that simple mixtures of unchanged starch and, for example, the nitrates are too insensitive and uncertain of detonation to be useful in the explosive art. Furthermore, and on the other hand, it is well known that nitrostarch is very sensitive to combustion and detonation, so much so, indeed, that it is a hazard in manufacture and use. I have found by experiment that the coagulated compositions are intermediate to simple mixtures and nitrostarch in sensitiveness toward combustion and detonation, that they are superior to simple mechanical mixtures in control of density, in protection against moisture and in variation of size of grains and finally that coagulums of starch and ammonium nitrate, etc. are superior to nitrostarch in power, safety and cost. Furthermore, the percentages of starch in the coagulated masses can be varied to controlled explosive advantages, but nitrostarch, on the other hand, possesses substantially definite percentages of composition and fixed explosive properties.

I have found by experiment that even when less than 5% of starch is used, the gelatinized mixtures yield adhesive though substantially porous grains, however, the higher concentrations of starch give tougher and more easily worked compositions. I can use, for example, either 15% or 25% of starch with ammonium nitrate, which percentages are in accordance with equations (c) and (d) and yield $CO_2$ and $CO$ respectively. Or I can depart from these percentages of starch so that with ammonium nitrate or other oxidants I can obtain compositions attaining maxima of explosive power or admitting of addition of another oxidant or combustible or both.

In the presence of soluble nitrates and water, starch begins to gelatinize substantially at 55° C. as can be proved by the iodine test, or, under the microscope, its granulated forms can be observed to be changed to the colloid or gel state of minute sub-division. When cooled this gel thickens and coagulates. When a mixture of starch and a soluble nitrate is heated with a suitable quantity of water somewhat above 55° C. and is then cooled, the product is a hard brittle agglutinized mass in which crystals of the solute can be observed. However, if the mixture was first heated to 100° C., the cooled mass remains a jelly. In the former case, owing to partial solution of the nitrate, incomplete gelatinization resulted; in the latter case, the complete solution of the nitrate is so held by colloided starch that recrystallization does not result, except with less water, when microscopical crystals of the solute are formed in the colloidal fabric of starch. If the temperature of the mixture is carried much above 100° C., especially if present with such an oxidant as ammonium nitrate, some of the starch begins to dissolve or suffer disintegration and nitration. If much water is present in the mixture, syrupy masses are formed, or if little water is present, some starch will escape gelatinization. When pulverized soluble nitrates are present in cold water in quantities greater than their solubility in hot water, they are much reduced in size of particle by such hot water and the fineness can thereby be made to exceed that obtainable by the usual mechanical methods of pulverizing. Also, since the starch itself during gelatinization becomes minutely divided and uniformly distributed throughout the hot solutions, both materials approach the molecular state of subdivision, a condition that prevents the growth of large crystals, during cooling and evaporating, and indeed, in the dry coagulums during weathering, holds the components in a state of laminated separation that resists the growth of larger crystals.

Whereas many conditions can contribute thus to the formation of plastics, gels or conglomerates without or with efflorescent and sublimated nitrate in the dried composition, the process can be applied to yield uniformly either a homogeneous vitreous mass or a mixture of such containing crystalline particles of microscopic dimensions. The blended materials of the compositions are sub-microscopical or are far smaller than can be obtained practicably by the mechanical processes of grinding, sifting, etc.; there are many explosive advantages of such minute and homogeneous, or substantially homogeneous, conditions of the compositions, which may contain microscopic particles of the nitrate associated with or embedded in the tough binder of coagulated starch. The grains are more sensitive to ignition and yield greater power than mingled masses of the same ingredients. The density is greater and in control of form and sizes of grains the progressiveness of combustion can be regulated to all explosive requirements.

During the process of manufacturing these coagulated compositions, the water functions both as the colloidizing agent for the starch and as the solvent for the nitrate and some of the starch. Because saturated solutions are formed during cooling and evaporating, and because of the capillary influence of such solutions during evaporation, the deposition of materials assumes the form of minutely mixed and adhering particles whose aggregate mass is characterized by substantial porosity. The volume of air contained in the porous mass may be about equal to the volume of expelled water. The porosity can be demonstrated in the varied densities of samples manufactured with different percentages of water, in the compressibility of all samples, and in their capacities to absorb oily liquids. When compositions of greater densities are desired, smaller concentrations of water are used or the dried or partly dried compositions can be compressed. The quantity of water employed is conditioned, therefore, not only by the properties of the product desired but also by the solubility of the salt used. Since ammonium nitrate is enormously soluble in hot water and the other nitrates or other oxidants are less soluble, the former necessitates the least water. In general, the process employs substantially less than 25% of water which is much less than employed by Lyte and Lewall (British Patent, No. 14,379 of 1884) to manufacture explosives by treating starch with potassium chlorate.

I have found that starchy powders such as the food flours, containing as they do a preponderance of starch, can be used in my process to obtain coagulated masses with soluble nitrates and that the properties of the resulting compositions are substantially identical with those of the pure starch compositions. Furthermore, my process is applicable to the employment of any water-soluble nitrate that will form explosive mixtures with starch, hence all soluble nitrates, are available. I may employ any such single nitrate or admixtures of two or more of them without departure from my process. I have also found by experiment that even pulverized insoluble explosives such as trinitrotoluene, picric acid, diazodinitrophenol, etc., or even liquid or colloidized explosives such as nitroglycerine or nitrocellulose, can be mixed with the starch-nitrate jelly so that the resulting compositions can be granulated or moulded quite like the simple starch-nitrate composition. Furthermore, I have found that powdered sulphur, aluminium and other combustibles, not in themselves explosive, may be blended with the simple coagulum or its composite mixtures. All of these, or any other explosive composition whose combustible, or binding material, is wholly or largely coagulated starch, involving as they do the gelatinizing of starch by water for admixtures with soluble nitrates are held to fall within the scope of my claims.

Whereas the colloidizing property of starch has long been known, and whereas the explosive energy of mixtures of uncoagulated starch and nitrates has long been known, the combined advantages of these properties as the basis of an easy process of manufacturing superior explosive compositions has not hitherto been revealed. I am aware that there are explosive compositions whose ingredients are soluble oxidants and coagulated starch, or some meal or flour whose preponderating mass is starch, but hitherto no explosive compositions of nitrates and coagulated starch have been revealed. In the prior art, either the starch has not been gelatinized (Himalaya, U. S. Pat. 853,085) or has been gelatinized throughout batches of all components thus giving a jelly or cake difficult to dry and to pulverize.

My improved process involves a small concentration of water with pulverized materials so that the cold mass can first be granulated, then coagulated and finally dried. This preliminary granulation avoids the difficulties of the prior process, especially in respect to hazard, cost and simplicity in of granulating and drying. The novelty of my invention, therefore, resides in the process of mixing pulverized soluble oxidants and starch with so little water that their cold mixtures can be granulated prior to coagulation. The further novelty of my invention resides in the new composition of matter comprising soluble nitrates and coagulated starch, useful as an explosive or as a component of explosive mixtures.

For purpose of illustration, I will describe an embodiment of my invention in which the oxidant is ammonium nitrate. To manufacture a 20% starch composition, I may take 9 parts of ammonium nitrate and heat it with one part of water until a solution is obtained. This I cool to the point of crystallization or practicably below 50° C. and then rapidly mix it with a cold paste consisting of one part of water, three parts of powdered starch and three parts of powdered ammonium nitrate. The proportions of materials here used are:

|  | Parts | Percentages |
|---|---|---|
| Powdered starch | 3 | 17.7 |
| Ammonium nitrate | 12 | 70.6 |
| Water | 2 | 11.7 |

This mixture is stirred rapidly, with practical avoidance of incorporating of air and is permitted to cool and crystallize so that the moist solid mixture can be granulated through a sieve or by other suitable apparatus. The grains are collected on trays in convenient layers and the trays are transferred to the dryer where temperatures of 55–100° C. are maintained until the grains are coagulated and dried.

To manufacture a 25% starch composition with sodium nitrate, I may take one part of pulverized starch and three parts of finely powdered sodium nitrate and mix them thoroughly. Then I may add enough water (5–10%) to yield a mixture that can be pressed into adhesive masses to be rubbed through a sieve or granulated in other ways. The grains thus formed are dried in such depth of layers and at such temperatures as are necessary to produce coagulation of the starch without yielding caking of the grains. The dried or partly dried grains can be compressed and then regranulated and completely dried. The grains thus formed are sufficiently dense and combustible to be used in many explosive compositions.

To make a starch-nitrate composition of the following percentages:

|  | Per cent |
|---|---|
| Ammonium nitrate | 40 |
| Sodium nitrate | 40 |
| Starch | 20 |

I may heat a mixture of 8 parts of ammonium nitrate, 2 parts of sodium nitrate and one part of water until all the nitrates are dissolved. The mixture can be cooled to 40–50° C. without crystallization taking place. To this cooled solution I now add an intimate mixture of 6 parts of powdered sodium nitrate, 4 parts of powdered starch and one part of water. The resulting mixture now contains about 11% of water and on standing has the proper consistency to be granulated, coagulated and dried as hitherto described.

Explosive compositions containing nitrates, especially ammonium nitrate or ammonium nitrate together with sodium nitrate, on account of their hygroscopic nature, have suffered in storage deterioration of sensitiveness in explosion, owing to absorption of water vapor from the air. This difficulty has been overcome more or less, by various methods of waterproofing the grains of nitrate with oils, etc. I have found that the explosive grains manufactured in accordance with my process have enhanced resistance to atmospheric water and that this property results from the compact granular form obtained by coagulating pre-formed grains of the components, a condition not obtainable by the reverse process of grinding pre-coagulated cake since this latter process tends to give rise to powdery particles and to separate the components.

In general, the powders manufactured by the process disclosed herein, are hard and brittle masses and are sufficiently sensitive to be exploded by moderate, initial detonating charges, while others require secondary sensitizing components. As detonating or disruptive charges, they compare very favorably, both in power and rates of detonation, with other explosives used for the same purposes. Moreover, the explosive properties can easily be controlled by variations of composition and granulation. The ammonium nitrate composition is substantially both smokeless and flameless and is practically proof against accidental or spontaneous ignition. The safety property is enhanced by the presence of starch which is not only a combustible and a binding material, but also a stabilizer for adventitious nitric acid, etc.

Having now fully described my invention, what I claim and desire to protect by Letters Patent is:

1. Process of making disruptive explosives which comprises mixing starch with ammonium nitrate in the proportion of about one part of the former to about three parts of the latter, mixing therewith about 1.6 parts of a solution of ammonium nitrate of about 1.3 specific gravity, and subjecting to heat over 55° and under 100° C., whereby the starch is coagulated and the water content substantially reduced.

2. In the manufacture of explosives the process which comprises making a mixture of 10–25% of starch, 75–90% of ammonium nitrate and 5–20% of water, granulating the same and then coagulating and drying at 55–100° C.

In testimony that I claim the foregoing, I hereto set my hand, this 5th day of January, 1924.

WILLIAM M. DEHN.